United States Patent
Geiger et al.

(10) Patent No.: US 12,145,612 B2
(45) Date of Patent: Nov. 19, 2024

(54) DEVICE AND METHOD FOR CONTROLLING A HARDWARE AGENT IN A CONTROL SITUATION HAVING A PLURALITY OF HARDWARE AGENTS

(71) Applicant: Robert Bosch GmbH, Stuttgart (DE)

(72) Inventors: Philipp Geiger, Leonberg (DE); Christoph-Nikolas Straehle, Ingolstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 571 days.

(21) Appl. No.: 17/371,076

(22) Filed: Jul. 8, 2021

(65) Prior Publication Data
US 2022/0048527 A1 Feb. 17, 2022

(30) Foreign Application Priority Data

Aug. 14, 2020 (DE) .......................... 102020210376.3

(51) Int. Cl.
| | |
|---|---|
| *B60W 50/08* | (2020.01) |
| *B60W 50/00* | (2006.01) |
| *B60W 60/00* | (2020.01) |
| *G06N 3/045* | (2023.01) |
| *G06N 3/08* | (2023.01) |

(52) U.S. Cl.
CPC ...... *B60W 50/085* (2013.01); *B60W 50/0097* (2013.01); *B60W 60/001* (2020.02); *G06N 3/045* (2023.01); *G06N 3/08* (2013.01); *B60W 2050/0044* (2013.01)

(58) Field of Classification Search
CPC .......... B60W 50/085; B60W 50/0097; B60W 60/001; B60W 2050/0044; G05D 2201/02; G05D 1/0061; G05D 1/0088; G06N 3/045; G06N 3/08
See application file for complete search history.

(56) References Cited

U.S. PATENT DOCUMENTS

| | | | |
|---|---|---|---|
| 10,627,823 B1 * | 4/2020 | Kim | G06V 20/56 |
| 11,037,320 B1 * | 6/2021 | Ebrahimi Afrouzi | G06T 7/90 |
| 11,230,297 B2 * | 1/2022 | Zhu | B60W 40/04 |
| 11,684,886 B1 * | 6/2023 | Ebrahimi Afrouzi | B01D 46/76 95/282 |
| 2011/0275364 A1 * | 11/2011 | Austin | H04L 41/06 455/423 |

(Continued)

FOREIGN PATENT DOCUMENTS

WO 2019180506 A2 9/2019

*Primary Examiner* — Sohana Tanju Khayer
(74) *Attorney, Agent, or Firm* — NORTON ROSE FULBRIGHT US LLP; Gerard A. Messina

(57) ABSTRACT

A device and method for controlling a hardware agent in a control situation having a plurality of hardware agents. The method includes ascertaining of a potential function by a first neural network; ascertaining of a control scenario for a control situation from a plurality of possible control scenarios by a second neural network; ascertaining a common action sequence for the plurality of hardware agents by seeking an optimum of the ascertained potential function over the possible common action sequences of the ascertained control scenario; and controlling at least one of the plurality of hardware agents in accordance with the ascertained common action sequence.

9 Claims, 3 Drawing Sheets

(56) References Cited

U.S. PATENT DOCUMENTS

| | | | |
|---|---|---|---|
| 2017/0193338 A1* | 7/2017 | Huberman | G06V 10/82 |
| 2019/0243371 A1* | 8/2019 | Nister | G05D 1/0231 |
| 2020/0174490 A1* | 6/2020 | Ogale | G06N 3/084 |
| 2020/0180612 A1* | 6/2020 | Finelt | G05D 1/0088 |
| 2020/0257301 A1* | 8/2020 | Weiser | G06V 20/56 |
| 2020/0272148 A1* | 8/2020 | Karasev | G01S 13/865 |
| 2020/0406894 A1* | 12/2020 | Akella | B60W 10/18 |
| 2021/0104171 A1* | 4/2021 | White | G06N 3/006 |
| 2021/0158058 A1* | 5/2021 | Levi | G05D 1/0251 |
| 2021/0197720 A1* | 7/2021 | Houston | G06N 3/045 |
| 2021/0197813 A1* | 7/2021 | Houston | G05D 1/0223 |
| 2021/0370980 A1* | 12/2021 | Ramamoorthy | G06F 18/214 |
| 2021/0380099 A1* | 12/2021 | Lee | G08G 1/04 |
| 2021/0387652 A1* | 12/2021 | Shou | B60W 60/00274 |
| 2022/0032960 A1* | 2/2022 | Wang | G05D 1/0088 |
| 2022/0036173 A1* | 2/2022 | Wulfe | G06N 5/022 |
| 2022/0188583 A1* | 6/2022 | Yang | G06F 18/2178 |
| 2023/0227063 A1* | 7/2023 | Badouin | G08G 1/096775 701/23 |

\* cited by examiner

DEVICE AND METHOD FOR CONTROLLING A HARDWARE AGENT IN A CONTROL SITUATION HAVING A PLURALITY OF HARDWARE AGENTS

CROSS REFERENCE

The present application claims the benefit under 35 U.S.C. § 119 of German Patent Application No. DE 102020210376.3 filed on Aug. 14, 2020, which is expressly incorporated herein by reference in its entirety.

FIELD

Various exemplary embodiments of the present invention relate in general to devices and methods for controlling a (or a plurality of) hardware agent(s) in a control situation having a plurality of hardware agents.

BACKGROUND INFORMATION

In recent years, autonomous driving has become a subject of great interest both in research and among the public. Autonomous vehicles have enormous potential, not just economically, but also for the improvement of mobility capacities, and potentially for reducing carbon emissions. Like all control tasks, autonomous driving includes making decisions in a particular control situation. Especially in autonomous driving, in a driving situation a plurality of vehicles are typically involved, and the actions that a vehicle has to carry out depend on the actions carried out by one or more other vehicles. In other words, there is a plurality of interacting agents, and it is desirable to find a controlling for an agent to be controlled ("home agent)" that takes into account what the goals of the other agents are and how, based thereon, these other agents will behave (under the assumption of a kind of rationality on the part of the other agents), and, based thereon, to find a controlling of the home agent that maximizes its utility and is robust relative to the behavior of the other agents (e.g., other vehicles). Because all agents have a plurality of actions available to them, and for example in street traffic corresponding control commands have to be produced in real time, efficient procedures are desirable for controlling hardware agents in a control situation having a plurality of hardware agents (e.g., vehicles).

SUMMARY

According to various specific embodiments of the present invention, a method is provided for controlling a hardware agent in a control situation having a plurality of hardware agents, the method including: ascertaining items of information that characterize and/or influence the behavior of the plurality of hardware agents and/or the control situation; ascertaining a potential function by supplying the items of information that characterize and/or influence the behavior of the plurality of hardware agents and/or the control situation to a first neural network that is trained to output, from items of information that characterize and/or influence the behavior of a plurality of hardware agents and/or the control situation, parameter values of a potential function, the potential function assigning to all the action sequences that include an action sequence in the control situation for each hardware agent a respective potential value that characterizes the utility that the hardware agents have from the respective common action sequence in the control situation; ascertaining a control scenario for the control situation from a plurality of possible control scenarios by supplying the items of information that characterize and/or influence the behavior of the plurality of hardware agents and/or the control situation to a second neural network that is trained to ascertain, from items of information that characterize and/or influence the behavior of a plurality of hardware agents and/or the control situation, one or more control scenarios from the plurality of possible control scenarios for the control situation, each control scenario containing a set of possible common action sequences for the hardware agents; ascertaining a common action sequence for the plurality of hardware agents by seeking a local optimum of the ascertained potential function over the possible common action sequences of the ascertained control scenario; and controlling at least one of the plurality of hardware agents in accordance with the ascertained common action sequence.

The potential value characterizes the utility values, i.e., in particular the preferences, of the hardware agents.

The method described above enables the ascertaining of (future) common trajectories of a plurality of movable devices, e.g., hardware agents, e.g., a plurality of vehicles, that takes into account what the goals of the other agents are and how, based thereon, these agents will behave. This ascertained common trajectory can then be used, e.g., both for the controlling of an individual (or a plurality of) agent(s) and also for the pure prediction of all agents. This is for example an important subtask for driver assistance systems and self-driving vehicles, but can also be applied in other control situations having a plurality of interacting devices (also referred to as agents in the control context) that are not traffic participants.

As an illustration, a game-theoretic layer is inserted into a neural network that predicts future trajectories of mobile devices. This means in particular that the future trajectories (which are given by action sequences) are predicted by ascertaining (local) Nash equilibria. The game has parameters that are predicted by a neural network from items of information that characterize or influence the behavior of the plurality of hardware agents and/or the control situation, e.g., previous observed trajectories of the hardware agents (e.g., vehicles) involved. The game-theoretic layer can be designed so that it is differentiable, which enables an efficient gradient-based end-to-end training of the overall network, although the game-theoretic layer is designed for the solution of an optimization problem (and is thus an implicit layer, in which the relation between the input and the output is not given explicitly as a simple function, but rather only, e.g., by an equation). The game (and thus in particular its parameters) describes the goals, or utility functions, of the agents, and under certain assumptions (details below) can be characterized by the potential function mentioned above.

The control situation can include a plurality of agents having a plurality of tasks, e.g., a robot for distributing seeds and a robot for watering. The information that characterizes or influences the behavior of the plurality of hardware agents and/or the control situation can in this case be information about the tasks (e.g., seed distribution, watering).

The information can also be for example whether it is raining (which changes the control situation and also the behavior of the agents; e.g., the watering robot will then water less or not at all). In a traffic situation, the information can also include the type of a vehicle, e.g., truck (drives and accelerates more slowly) or sports car (drives and accelerates more quickly).

The items of information can also be sensor data from which the behavior and/or the control situation can be derived (i.e., that represent the behavior or the control situation).

The values of the game parameters are ascertained from these items of information by the first neural network (NN), which in various specific embodiments is referred to as a preference-ascertaining NN. The intermediate representation outputted by this NN can be checked (e.g., checked for consistency, e.g., consistency with previous knowledge), because it is interpretable and corresponds to preferences of the hardware agents (i.e., agents).

Previous knowledge about the preferences of the hardware agents can be coded into the game, so that the predicted actions (in particular the ascertained action sequence for controlling the at least one hardware agent) is consistent with the previous knowledge.

The first neural network can be designed such that its task, i.e., the intermediate representation, is low-dimensional. This enables in particular training with a small data set.

The second neural network, which in various specific embodiments is designated the equilibrium-refining NN, makes the game-theoretic layer tractable (i.e., capable of being realized in practice). According to a specific embodiment of the present invention, its task is in particular to reduce the number of candidates for Nash equilibria that have to be evaluated or for which solutions have to be found.

Each predicted common trajectory (i.e., set of trajectories, one for each hardware agent) is given by a Nash equilibrium of the game. Therefore, the trajectories of the hardware agents are consistent; they correspond to an (approximately) rational (i.e., reasonable) behavior, and follow the specified conditions (e.g., preferences) that are coded in the game (i.e., the parameters of the potential function).

In the following, various exemplary embodiments are indicated.

Exemplary embodiment 1 is a method for controlling a hardware agent in a control situation having a plurality of hardware agents as described above.

Exemplary embodiment 2 is the method of exemplary embodiment 1 including ascertaining of a plurality of control scenarios for the control situation from the plurality of possible control scenarios, and ascertaining, for each ascertained control scenario, a probability value of the ascertained control scenario;
  selecting one or more control scenarios from the ascertained control scenarios whose probability values are the highest among the ascertained control scenarios;
  ascertaining, for each selected control scenario, a common action sequence for the plurality of hardware agents by seeking an optimum of the ascertained potential function over the possible common action sequences of the selected control scenario; and
  controlling the at least one hardware agent in accordance with one of the ascertained common action sequences.

The probability value of a control scenario represents the probability of the control scenario, but does not necessarily have to be between 0 and 1; i.e., the probability values can be scaled arbitrarily. Through selection of the control scenarios (i.e., as an illustration, the control variants or control options) whose probability is the highest, the number of control scenarios for which a common action sequence is ascertained is reduced. This reduces the complexity and enables for example a (realistic) practical realization for a real-time controlling, e.g., in a vehicle.

Exemplary embodiment 3 is the method of exemplary embodiment 1 or 2, having:
  ascertaining of a plurality of control scenarios for the control situation from the plurality of possible control scenarios and ascertaining, for each ascertained control scenario, a probability of the ascertained control scenario; ascertaining, for each ascertained control scenario, a common action sequence for the plurality of hardware agents by seeking an optimum of the ascertained potential function over the possible common action sequences of the ascertained control scenario;
  selecting a common action sequence from the ascertained action sequences, so that a goal function that is a function of the probability and/or utility is optimized by the selected action sequence over the ascertained action sequences; and
  controlling the at least one hardware agent according to the selected common action sequence.

The goal function is for example a sum, weighted with a prespecified weighting, of the probability and utility. Criteria such as compliance with traffic regulations may also be used for the selection of a common action sequence. The utility can include in particular a measure of the quality and a measure of the costs (e.g. negatively weighted, because these should be as low as possible).

The selection of a common action sequence taking into account probability and utility enables an efficient controlling.

Exemplary embodiment 4 is the method of one of exemplary embodiments 1 through 3, further including the ascertaining of additional parameter values of the potential function that indicate control preferences of the hardware agents from additional previous knowledge about the hardware agents, and ascertaining of the potential function from the parameter values outputted by the first neural network, and from the additional parameter values.

In this way, previous knowledge can also enter into the controlling, and in particular can create the possibility of adapting the controlling in accordance with preferences. These are to be understood as also including constraints such as a speed limitation. Information about street geometry, an environmental map, and the like may also be supplied.

Exemplary embodiment 5 is the method of one of exemplary embodiments 1 through 4, having the ascertaining of the possible control scenarios, so that for each control scenario the potential function on the set of possible common action sequences for the hardware agents that contains the control scenario is concave (if a utility is maximized) or convex (if costs are minimized).

In this way it is ensured that an efficient search can be carried out for the optimum of the potential function for each control scenario, which makes for example a real-time controlling practically realizable (e.g. given particular available hardware).

Exemplary embodiment 6 is the method of one of exemplary embodiments 1 through 5, having training of the first neural network through supervised learning with first training data that include a plurality of first training data elements, each first training data element including items of information that characterize and/or influence the behavior of a plurality of hardware agents and/or the control situation, and a ground truth for the common (future) action sequence;
  and training of the second neural network through supervised learning with second training data that include a plurality of second training data elements, each second training data element including items of information that characterize and/or influence the behavior of a plurality of hardware agents and/or the control situation, and a ground truth for the control scenario.

In this way, the two neural networks can be trained separately from one another, which enables an efficient training of the overall network.

Exemplary embodiment 7 is the method of exemplary embodiment 6, the training of the first neural network including the ascertaining of a gradient of a loss function in relation to the parameters of the potential function, by ascertaining (for example analytically) a gradient of the mapping of the potential function onto the common action sequence (in other words, of values of parameters of the potential function onto the common action sequence) that are realized through the search for the local optimum.

This enables an efficient training, despite the implicit layer contained due to the optimization layer (seeking the optimum).

Exemplary embodiment 8 is the method of one of exemplary embodiments 1 through 7, the items of information that characterize and/or influence the behavior of the plurality of hardware agents and/or the control situation indicating previous movement trajectories of the plurality of hardware agents.

Previous movement trajectories are an efficient possibility for obtaining information about the behavior of agents (in particular the preferences and the future behavior to be expected).

Exemplary embodiment 9 is a device for controlling a hardware agent that is set up to carry out the method of one of exemplary embodiments 1 through 8.

Exemplary embodiment 10 is a computer program having program instructions that, when they are executed on one or more processors, cause the one or more processors to carry out a method according to one of the exemplary embodiments 1 through 8.

Exemplary embodiment 11 is a computer-readable storage medium on which program instructions are stored that, when they are executed by one or more processors, cause the one or more processors to carry out a method according to one of the exemplary embodiments 1 through 8.

Exemplary embodiments of the present invention are shown in the Figures and are explained in more detail in the following. In the figures, identical reference characters generally relate to the same parts everywhere, in the various views. The figures are not necessarily true to scale; instead, the emphasis is generally on illustrating the features of the present invention.

DETAILED DESCRIPTION OF EXAMPLE EMBODIMENTS

The various specific embodiments of the present invention, in particular the exemplary embodiments described in the following, can be implemented by one or more circuits. In a specific embodiment, a "circuit" can be understood as any type of logic-implementing entity, which can be hardware, software, firmware, or a combination thereof. Therefore, in a specific embodiment a "circuit" may be a hardwired logic circuit or a programmable logic circuit, such as a programmable processor, for example a microprocessor. A "circuit" may also be software implemented or executed by a processor, for example any type of computer program. Every other type of the implementation of the respective functions described in more detail in the following can be understood, in agreement with an alternative specific embodiment, as a "circuit."

Figure 1:
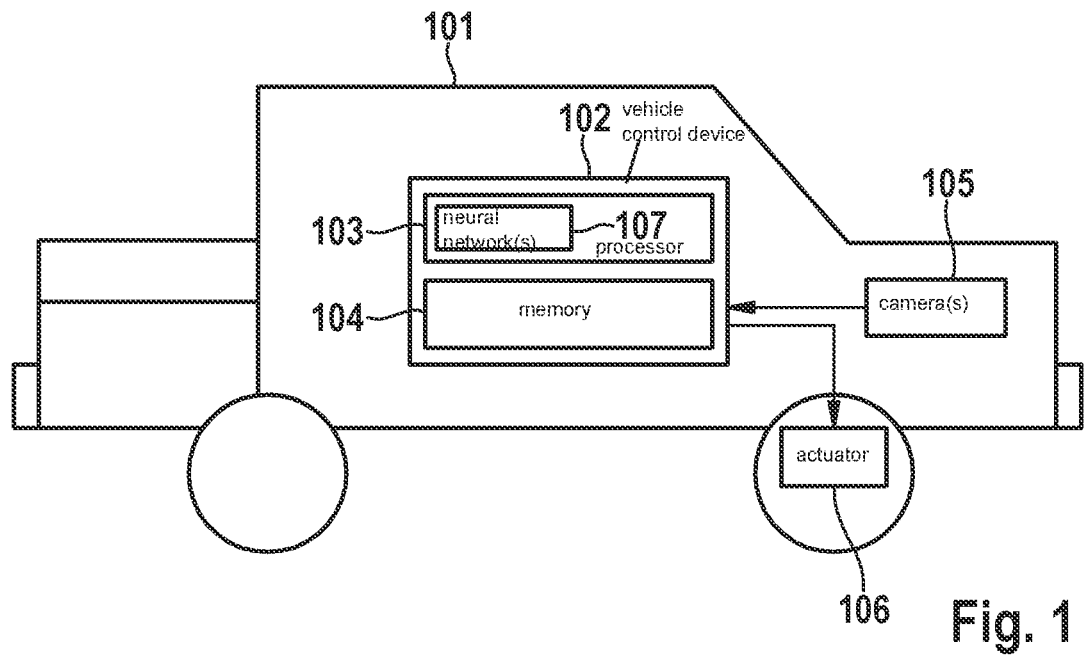
FIG. 1 shows a vehicle according to a specific example embodiment of the present invention.

FIG. 1 shows a vehicle 101.

In the example of FIG. 1, a vehicle 101, for example a passenger vehicle or a truck, is provided with a vehicle control device 102.

Vehicle control device 102 has data-processing components, e.g. a processor (e.g., a CPU (central unit)) 103 and a memory 104 for storing control software according to which vehicle control device 102 operates, and data that are processed by processor 103.

For example, the stored control software has (computer program) instructions that, when the processor executes them, bring it about that processor 103 implements one or more neural networks 107.

The data stored in memory 104 can contain for example image data that are acquired by one or more cameras 105. The one or more cameras 105 can for example record one or more grayscale or color photos of the surrounding environment of vehicle 101.

Vehicle control device 102 can examine the image data and control vehicle 101 in accordance with the results. Thus, vehicle control device 102 can for example control an actuator 106 (e.g., a brake) in order to control the speed of the vehicle, e.g., to brake the vehicle.

Using the image data (or also data from other information sources, such as other types of sensors or also vehicle-vehicle communication), vehicle control device 102 can detect objects in the surrounding environment of vehicle 101, in particular other vehicles.

Vehicle control device 102 must then decide how it will control vehicle 101. For this purpose, vehicle control device 102 can predict where one or more other objects, e.g. one or more other vehicles, will move to. Together with the home trajectory (i.e., the trajectory of vehicle 101), the one or more trajectories of the one or more other vehicles form a common trajectory.

Figure 2:
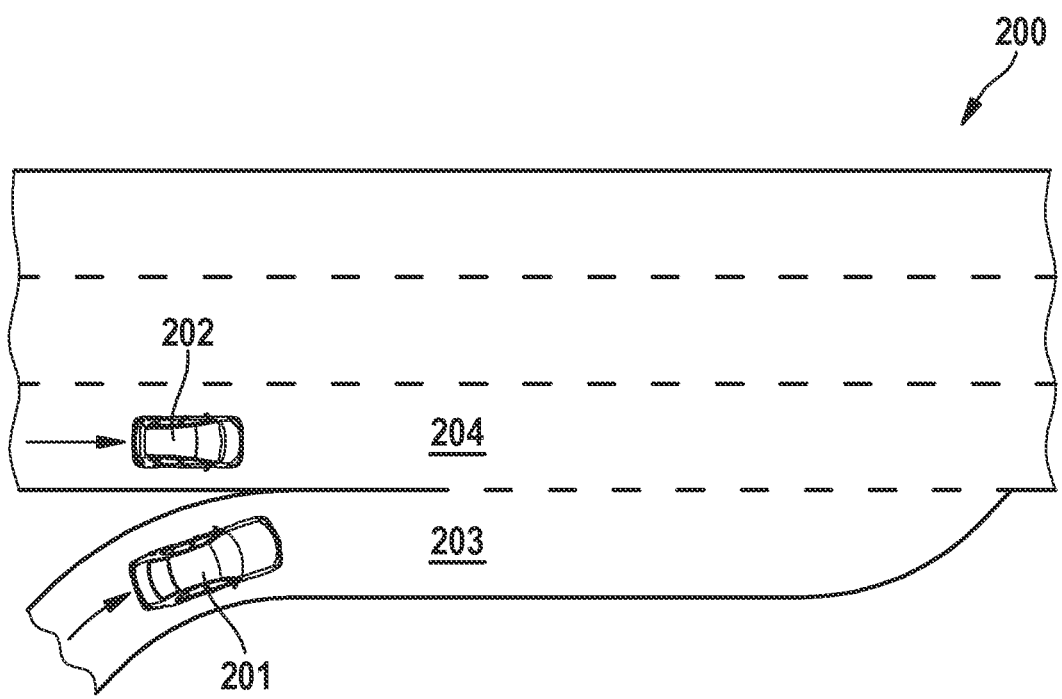
FIG. 2 shows, as an example, a traffic situation with two vehicles.

FIG. 2 shows, as an example, a traffic situation 200 with two vehicles.

In traffic situation 200, a first vehicle 201, which for example corresponds to vehicle 101, is driving on a highway. On the right lane 204 of the highway there is already situated a second vehicle 202 (from the point of view of first automobile 201, an "other vehicle"). First vehicle 201 is first situated in the acceleration lane 203, and the task of vehicle control device 102 is to control first vehicle 201 in such a way that it moves into the right lane 204 of the highway, while taking into account particular conditions (also referred to as preferences), such as a too-small distance from the second vehicle (in particular the avoidance of a collision), avoiding excessive acceleration, avoiding excessive speed, etc.

From the beginning of traffic situation 200 (as shown in FIG. 2) at a time t=0 until the end of the traffic situation at a time t=T (for example when both vehicles 201, 202 are driving on the highway), the two vehicles each follow a respective trajectory. Together, the two trajectories form a "common" trajectory.

In the general case, in a control situation there is a set $I:=\{1, \ldots, n\}$ of agents. The agents can be vehicles and the control situation can be a traffic situation, but other applications are also possible; for example, the control situation may contain a plurality of robot arms that together process a product in a company. In this case as well, collisions between the robot arms are to be avoided, and further conditions are to be observed (e.g., rapid processing of the product, and correspondingly few inactive phases of the robot arms). A further example of use is the controlling of mobile robots that travel about on a factory floor, for example in order to distribute material. These robots sometimes travel in areas where human beings are also circulating. For this purpose, it is also important to predict the trajectories of the humans, and finally to ascertain good trajectories for the robots.

Each agent $i \in I$ has at each time $t \in [0,T]$ an individual state $y_t^i \in \mathbb{R}^{d}Y_0^1$. The sequence of the states of an agent together yield the (individual) trajectory $y^i = (y_t^i)_{t \in [0,T]}$ of the agent. Together, the trajectories of the agents form the common trajectory $y := ((y_t^1, \ldots, y_t^n)_{t \in [0,T]} \in Y$ of the agents. These are to be predicted for $t \in [0,T]$, and they are therefore also referred to as the future common trajectory.

It is assumed that a previous common trajectory x (that for example goes up to time t=0) is available, for example through communication between vehicles 201, 202, or also mutual observation. Alternatively to the previous common trajectory, items of information such as sensor data may also be used, from which the behavior and/or the control situation can be derived (i.e. that represent the behavior or the control situation).

Let the trajectory $y^i$ of the i-th agent be determined by a vector $a^i \in A^i \subseteq \mathbb{R}^{d}A^1$, which is designated as the action sequence of agent i, where $A^i$ is the space of action sequences (i.e. the combinations of possible actions). Correspondingly, the common trajectory is given by a parametrization $r: A \to Y$, where $A := A^1 \times \ldots \times A^n$ is the space of common action sequences. An action sequence does not necessarily have to be a sequence of separate actions; for example, it can also consist in driving with a constant speed. The actions of the action sequence (i.e. at all times) would then be identical, namely driving with the (constant) speed.

In the following, $a^{-i}$ indicates that the i-th component has been omitted, i.e. $(a^1, \ldots, a^{i-1}, a^{i+1}, a^n)$.

The prediction can contain a plurality of predicted trajectories $a_k$, each having a respective probability $q_k$. Each predicted trajectory $a_k$ can for example correspond to a control scenario (in other words, a control option or control possibility) having index k. For example, one of the predicted trajectories $a_1$ corresponds to the control scenario in which first vehicle 201 is driving in front of second vehicle 202 on the highway, and a second predicted trajectory $a_2$ corresponds to the control scenario in which first vehicle 201 is driving behind second vehicle 202 on the highway.

The control situation can be viewed as a "game" in the sense of game theory. A game includes a set of agents ("players"), their possible actions, and their utility functions.

In the following, a (trajectory) game is understood as a game in which for each agent there exists a utility function $u^i: A \to \mathbb{R}$ having the form $u^i(a) = \int_0^i (y_{[t-\Delta,t]}) d\mu(t)$, where $a \in A$
$u_t^i$, $t \in [0,T]$, the utility functions per time step (of length $\Delta$) of the agent i are
$y = r(a)$,
$\mu$ is a measure of time,
and $y_{[t-\Delta,t]} = (y_t)_{t \in [t-\Delta,t]}$.

A local Nash equilibrium is a common action sequence $a \in A$, when there exist open sets $S_i \subset A^i$, so that for each agent i $$a_i \in S_i \text{ and } u^i(a^i, a^{-i}) \geq u^i(a^{i'}, a^{-i}) \text{ for each } a^{i'} \in S_i.$$

A game is called a (exactly constant) potential game when there exists a so-called potential function (in the following also referred to as a utility potential function) $\psi$, such that $u^i(a^{i'}, a^{-i}) - u^i(a^i, a^{-i}) = \psi(a^{i'}, a^{-i}) - \psi(a^i, a^{-i})$ for all agents i, all action sequences $a^i, a^{i'}$ and remaining action sequences $a^{-i}$.

As utility functions per time step, for example functions such as the following are used:

$$u_t^{i,\theta}(y_{[t-\Delta,t]}) = u_t^{com,\theta}(y_{[t-\Delta,t]}) + u_t^{own,i,\theta}(y_{[t-\Delta,t]}^i) + u_t^{oth,i,\theta}(y_{[t-\Delta,t]}^{-i})$$

where
- $u_t^{com,\theta}$ is a term that is a function of the common trajectory and is common to all agents, and
- $u_t^{own,i,\theta}$ is a term that is a function only of the trajectory of the i-th agent, and can differ from agent to agent, and
- $u_t^{oth,i,\theta}$ is a term that is a function only of the trajectories of the agents other than the i-th agent, and can differ from agent to agent.

In this case, as potential function the function $$\psi(a,\theta) = \int_0^T u_t^{com,\theta}(y_{[t-\Delta,t]}) + \Sigma_{i \in I} u_t^{own,i,\theta}(y_{[t-\Delta,t]}^i) d\mu(t)$$

can be used.

The parameter vector $\theta$ contains the values of the parameters of the game and thus the potential function. It represents preferences of the agents.

According to various specific embodiments, via the potential function optimization takes place not over the common action sequence space A, but rather over a family $(\tilde{A}_k)_{k \in K}$ of subspaces $\tilde{A}_k \subseteq A$, in such a way that the potential function is strictly concave on each $\tilde{A}_k$. Each $\tilde{A}_k$ corresponds to a control scenario. For example, $\tilde{A}_1$ contains all action sequences in which first vehicle 201 merges behind second vehicle 202 and $\tilde{A}_2$ contains all action sequences in which first vehicle 201 merges behind second vehicle 202.

In this case, for each control scenario a local Nash equilibrium can be found by optimizing the potential function over the associated $\tilde{A}_k$, i.e., as argmax of $\psi(\theta, \cdot)$ on $\tilde{A}_k$.

In the following, a neural network is described that contains a layer (referred to as the "game-theoretical layer") that ascertains a common trajectory by seeking an optimum of the potential function.

Figure 3:
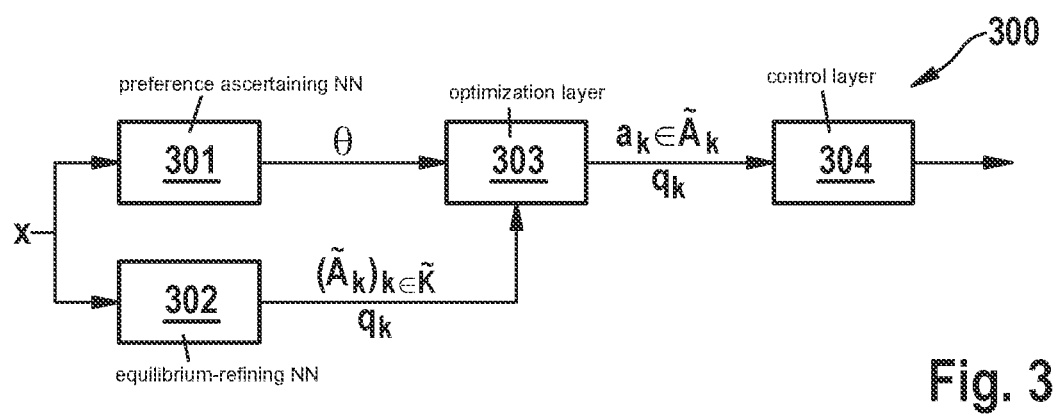
FIG. 3 shows a machine controlling model.

FIG. 3 shows a machine control model 300.

Control model 300 is for example a neural overall network, and is implemented by a control device, e.g. control device 107.

Control model 300 has a preference-ascertaining NN 301, an equilibrium-refining NN 302, an optimization layer 303 (also called the game-theoretic layer), and a control layer 304.

The input of the control model 300 is a common previous trajectory of the hardware agents (e.g., vehicles 201, 202), and the output of optimization layer 303 is one or more common future trajectories of the hardware agents (e.g., one common trajectory per control scenario, provided if appropriate with probabilities). Control layer 304 can derive, from a common future trajectory for one or more hardware agents, control commands, in such a way that a hardware agent to be controlled follows its individual trajectory, which is part of the common future trajectory.

Preference-ascertaining NN 301 is a neural network that ascertains the values of the parameters θ of the game, and thus ascertains the values of the parameters of the potential function from the previous common trajectory of the hardware agents. The parameters θ code the preferences of the hardware agents, as are apparent from the previous common trajectory. These are for example desired speed, allowed acceleration (or penalty for acceleration), penalty for crossing a lane boundary, preference for the center lane, etc. Preference-ascertaining NN 301 can be a fully connected neural network (e.g. having a two fully connected hidden layer each having 16 neurons), an LSTM-NN (long-short-term memory NN), a convolution network, etc.

Equilibrium-refining NN 302 is a neural network that ascertains a probability distribution over the control scenarios (i.e., over the $\tilde{A}_k$) and thus over the Nash equilibria of the game, i.e. assigns a probability $q_k$ to each $\tilde{A}_k$. Using this probability distribution, the following layers the number of Nash equilibria that have to be examined or evaluated in order to predict the common trajectory can be significantly reduced, for example by taking only the most probable control scenarios. Thus, in a simple specific embodiment, equilibrium-refining NN 302 can also ascertain only the most probable control scenario. Equilibrium-refining NN 302 can also be divided into two neural networks, of which one determines the control scenarios and one determines their probability distribution.

The equilibrium-refining NN 302 can be implemented as a classification NN (e.g., having a fully connected layer having 64 neurons and, e.g., dropout, in order to produce a probability distribution of the results over a plurality of runs) that classifies a common previous trajectory of the hardware agents in the sense that it assigns it a control scenario (or a plurality, each having a probability, e.g. softmax value), i.e. "classifies" it to form a control scenario.

Figure 4:
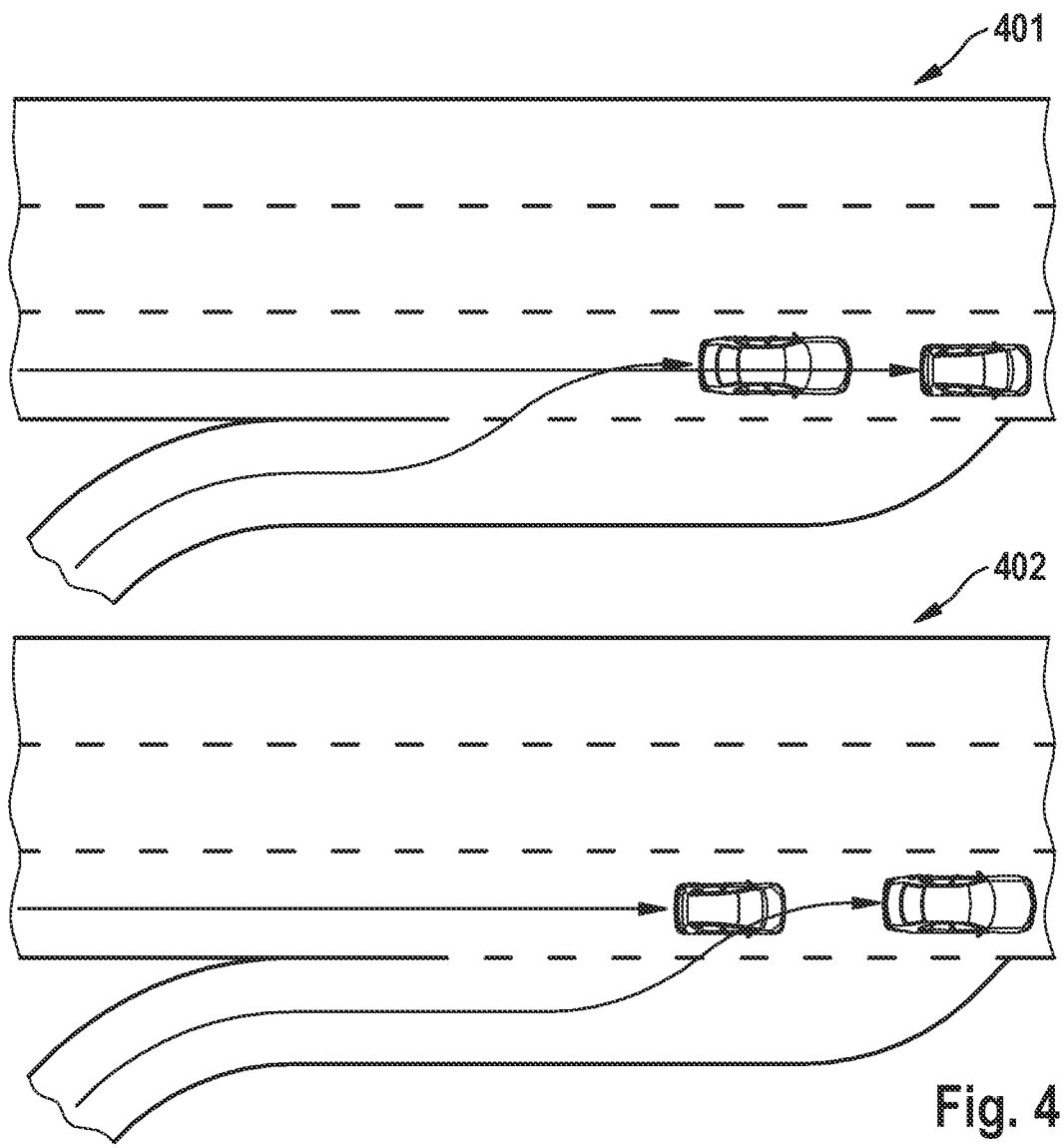
FIG. 4 shows two control scenarios for the traffic situation of FIG. 2.

FIG. 4 shows two control scenarios 401, 402 for the traffic situation of FIG. 2.

In the first control scenario 401, first vehicle 201 changes to the right lane of the highway behind second vehicle 202, and in the second control scenario first vehicle 201 changes to the right lane of the highway in front of second vehicle 202. For each of the two control scenarios, there exists a respective local Nash equilibrium.

Optimization layer 303 obtains as input the parameter values (output of the preference-ascertaining NN 301), and for each control scenario (e.g. for the most probable control scenario or scenarios), as outputted by equilibrium-refining NN 302, calculates the Nash equilibrium for the control scenario by optimizing the potential function as described above. The output of optimization layer 303 is a common trajectory (e.g. given in the form of a common action sequence $a_k \in \tilde{A}_k$) for the k-th control scenario of the control scenarios. Optimization layer 303 can seek an optimum of the potential function over the control scenario $\tilde{A}_k$ (i.e. over the common action sequences in the control scenario $\tilde{A}_k$), for example using a quasi-Newton method such as L-BFGS (Limited Memory Broyden-Fletcher-Goldfarb-Shanno). This is possible due to the concavity of the potential function on the subspaces $\tilde{A}_k$.

For a hardware agent that is to be controlled, control layer 304 takes the trajectory (i.e., action sequence) belonging to the hardware agent from the common trajectory from a control scenario, and produces corresponding control commands for the hardware agent that is to be controlled; i.e., for each action of the action sequence one or more control commands are produced that bring it about that the hardware agent to be controlled carries out the action, e.g., the corresponding actuators (engine, brake) are correspondingly activated. In the case of a plurality of control scenarios, control layer 304 can select one, e.g., the most probable one, having the lowest costs (or the highest utility) or a combination (e.g., weighted sum) of these criteria.

The hardware agent can be fully or partly automatic. For example, a vehicle can be controlled in fully autonomous fashion, or the driver can be supported (e.g., with steering movements in the case of a parking assistant).

For the training of control model 300, the weights of preference-ascertaining NN 301 and of equilibrium-refining NN 302 are adapted. This can take place for example in two separate training processes for equilibrium-refining NN 302 and for preference-ascertaining NN 301:

For example, a training data set is used having training data elements of which each contains a previous common trajectory and an associated Nash equilibrium (i.e., a future common trajectory). These can be obtained through simulations and/or demonstrations, i.e., recordings (e.g., using drone recordings) of real control processes (e.g., vehicle control processes) carried out by humans or by other control devices. An example of a training data set that can be used is the "highD" data set.

The weights of equilibrium-refining NN 302 are then trained through supervised learning in such a way that, for the previous common trajectories, equilibrium-refining NN 302 predicts the specified Nash equilibria (i.e., the ground truth Nash equilibria) as well as possible, e.g., using back-propagation, as is standard for supervised learning of this form.

For the training of preference-ascertaining NN 301, a loss on the output of optimization layer 303 is defined, e.g., the average square or absolute error of the predicted common trajectory relative to the common trajectory from the respective training data element. This loss can be back-propagated through optimization layer 303, and the weights of preference-ascertaining NN 301 can be trained in such a way that the loss at the output of optimization layer 303 is minimized.

If the function calculated by optimization layer 303 is written as $g_k(\theta)$, where, as above, k is the index of the control scenario, then for the back-propagation at location $a \in A$ the gradient $$J_\theta g_k(\theta) = -(H_a \psi(\theta,a))^{-1} J_\theta \nabla_a \psi(\theta,a)$$

can be used, where ∇, J and H designate the gradient, the Jacobi matrix, and the Hesse matrix respectively.

In sum, according to various specific embodiments of the present invention, a method is provided as is shown in FIG. 4.

Figure 5:
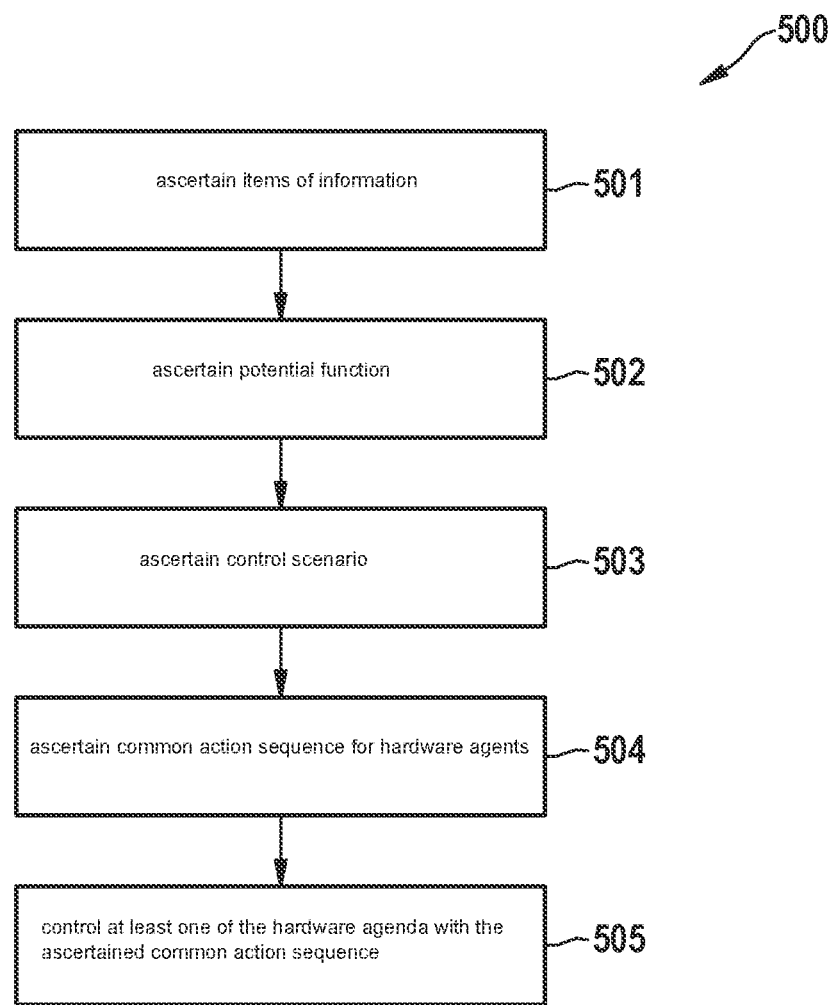
FIG. 5 shows a flow diagram that illustrates a method for controlling a hardware agent in a control situation having a plurality of hardware agents, in accordance with an example embodiment of the present invention.

FIG. 5 shows a flow diagram 500 that illustrates a method for controlling one or more hardware agents in a control situation having a plurality of hardware agents.

The method includes the following:

in step 501, the ascertaining of items of information that characterize and/or influence the behavior of the plurality of hardware agents and/or the control situation;

in step 502, ascertaining a potential function by supplying the items of information that characterize and/or influence the behavior of the plurality of hardware agents and/or the control situation to a first neural network that is trained to output, from items of information that characterize and/or influence the behavior of a plurality of hardware agents and/or the control situation, parameter values of a potential function, the potential function assigning to common action sequences, which each have an action sequence for each hardware agent in the control situation, a respective potential value that characterizes the utility that the hardware agents have from the respective common action sequence in the control situation;

in step 503, ascertaining a control scenario for the control situation from a plurality of possible control scenarios by supplying the items of information that characterize and/or influence the behavior of the plurality of hardware agents and/or the control situation to a second neural network that is trained to ascertain, from items of information that characterize and/or influence the behavior of a plurality of hardware agents and/or the control situation, a control scenario from the plurality of possible control scenarios for the control situation, each control scenario containing a set of possible common action sequences for the hardware agents; and in step 504, ascertaining a common action sequence for the plurality of hardware agents by seeking a local optimum of the ascertained potential function over the possible common action sequences of the ascertained control scenario; and in step 505, controlling at least one of the plurality of hardware agents in accordance with the ascertained common action sequence.

"Hardware agent" can be understood as referring to any physical system (having a mechanical part whose movement is controlled), such as a robot (e.g., a robot arm), a computer-controlled machine, a vehicle, a household appliance, an electric tool, a manufacturing machine, a personal assistant, or an access control system.

The first neural network and/or the second neural network can process sensor data of various types, e.g. sensor data from various sensors such as video, radar, lidar, ultrasound, movement, acoustics, thermal images, etc. These items of information can be supplied, in addition to the previous trajectories, to the preference-ascertaining NN and to the equilibrium-refining NN as inputs. The previous trajectories are to these neural networks for example in the form of one or more multivariate time series that contain the state (e.g., the position) of each hardware agent at each time (of the time raster in which the previous trajectories are given).

According to a specific embodiment of the present invention, the method is computer-implemented.

Although the present invention has been indicated and described primarily with reference to particular specific embodiments, those skilled in the relevant art will understand that numerous modifications thereof may be carried out with regard to realization and details without departing from the essence and scope of the present invention. The area of the present invention is intended to include that all modifications to the features disclosed herein.

What is claimed is:

1. A method for controlling a hardware agent in a control situation having a plurality of hardware agents, comprising the following steps:

ascertaining items of information that characterize and/or influence: (i) a behavior of the plurality of hardware agents and/or (ii) the control situation;

ascertaining a potential function by supplying the items of information that characterize and/or influence the behavior of the plurality of hardware agents and/or the control situation to a first neural network that is trained to output, from the items of information that characterize and/or influence the behavior of the plurality of hardware agents and/or the control situation, parameter values of the potential function, the potential function assigning to common action sequences, which each have an action sequence for each hardware agent in the control situation, a respective potential value that characterizes a utility that the hardware agents have from the respective common action sequence in the control situation;

ascertaining a control scenario for the control situation from a plurality of possible control scenarios by supplying the items of information that characterize and/or influence the behavior of the plurality of hardware agents and/or the control situation to a second neural network that is trained to ascertain, from the items of information that characterize and/or influence the behavior of the plurality of hardware agents and/or the control situation, one or more control scenarios from the plurality of possible control scenarios for the control situation, each of the control scenarios containing a set of possible common action sequences for the hardware agents;

ascertaining a common action sequence of the common action sequences for the plurality of hardware agents by seeking a local optimum of the ascertained potential function over the possible common action sequences of the ascertained control scenario;

controlling at least one of the plurality of hardware agents in accordance with the ascertained common action sequence, wherein the common action sequence is a common trajectory, wherein the second neural network determines a probability distribution over the control scenarios that reduces a number of Nash equilibria corresponding to the control scenarios that are used to predict the common trajectory;

training the first neural network through supervised learning with first training data that include a plurality of first training data elements, each of the first training data elements including items of information that characterize and/or influence the behavior of the plurality of hardware agents and/or the control situation, and a ground truth Nash equilibria for the common action sequence; and training the second neural network through supervised learning with second training data that include a plurality of second training data elements, each second training data element including items of information that characterize and/or influence the behavior of the plurality of hardware agents and/or the control situation, and the ground truth Nash equilibria for the control scenario.

2. The method as recited in claim 1, further comprising the following steps:

ascertaining, for each ascertained control scenario of the plurality of control scenarios, a probability value of the ascertained control scenario;

selecting one or more control scenarios from the ascertained control scenarios whose probability values are the highest among the ascertained control scenarios;

ascertaining, for each selected control scenario, the common action sequence for the plurality of hardware agents by seeking an optimum of the ascertained potential function over the possible common action sequences of the selected control scenario; and controlling the at least one hardware agent in accordance with one of the ascertained common action sequences.

3. The method as recited in claim 1, further comprising the following steps:

Ascertaining the plurality of control scenarios for the control situation from the plurality of possible control scenarios and ascertaining, for each of the ascertained control scenarios, a probability of the ascertained control scenario;

ascertaining, for each of the ascertained control scenarios, the common action sequence for the plurality of hardware agents by seeking an optimum of the ascertained potential function over the possible common action sequences of the ascertained control scenario;

selecting the common action sequence from the ascertained action sequences, so that a goal function that is a function of the probability and/or utility is optimized by the selected action sequence over the ascertained action sequences; and controlling the at least one hardware agent in accordance with the selected common action sequence.

4. The method as recited in claim 1, further comprising:

ascertaining additional parameter values of the potential function that indicate control preferences of the hardware agents from additional previous knowledge about the hardware agents; and ascertaining the potential function from the parameter values outputted by the first neural network and from the additional parameter values.

5. The method as recited in claim 1, further comprising:

ascertaining the possible control scenarios, so that for each of the possible control scenarios, the potential function on the set of possible common action sequences for the hardware agents that contain the possible control scenario, is concave or convex.

6. The method as recited in claim 1, wherein the training of the first neural network includes ascertaining a gradient of a loss function in relation to parameters of the potential function by ascertaining a gradient of a mapping of the potential function onto the common action sequence that is realized by seeking the local optimum.

7. The method as recited in claim 1, wherein the items of information that characterize and/or influence the behavior of the plurality of hardware agents and/or the control situation indicate previous movement trajectories of the plurality of hardware agents.

8. A device for controlling a hardware agent in a control situation having a plurality of hardware agents, the device configured to:

ascertain items of information that characterize and/or influence: (i) a behavior of the plurality of hardware agents and/or (ii) the control situation;

ascertain a potential function by supplying the items of information that characterize and/or influence the behavior of the plurality of hardware agents and/or the control situation to a first neural network that is trained to output, from the items of information that characterize and/or influence the behavior of the plurality of hardware agents and/or the control situation, parameter values of the potential function, the potential function assigning to common action sequences, which each have an action sequence for each hardware agent in the control situation, a respective potential value that characterizes a utility that the hardware agents have from the respective common action sequence in the control situation;

ascertain a control scenario for the control situation from a plurality of possible control scenarios by supplying the items of information that characterize and/or influence the behavior of the plurality of hardware agents and/or the control situation to a second neural network that is trained to ascertain, from the items of information that characterize and/or influence the behavior of the plurality of hardware agents and/or the control situation, one or more control scenarios from the plurality of possible control scenarios for the control situation, each of the control scenarios containing a set of possible common action sequences for the hardware agents;

ascertain a common action sequence of the common action sequences for the plurality of hardware agents by seeking a local optimum of the ascertained potential function over the possible common action sequences of the ascertained control scenario;

control at least one of the plurality of hardware agents in accordance with the ascertained common action sequence, wherein the common action sequence is a common trajectory, wherein the second neural network determines a probability distribution over the control scenarios that reduces a number of Nash equilibria corresponding to the control scenarios that are used to predict the common trajectory;

training the first neural network through supervised learning with first training data that include a plurality of first training data elements, each of the first training data elements including items of information that characterize and/or influence the behavior of the plurality of hardware agents and/or the control situation, and a ground truth Nash equilibria for the common action sequence; and training the second neural network through supervised learning with second training data that include a plurality of second training data elements, each second training data element including items of information that characterize and/or influence the behavior of the plurality of hardware agents and/or the control situation, and the ground truth Nash equilibria for the control scenario.

9. A non-transitory computer-readable storage medium on which is stored a computer program including program instructions for controlling a hardware agent in a control situation having a plurality of hardware agents, the program instructions, when executed by one or more processors, causing the one or more processor to perform the following steps:

ascertaining items of information that characterize and/or influence: (i) a behavior of the plurality of hardware agents and/or (ii) the control situation;

ascertaining a potential function by supplying the items of information that characterize and/or influence the behavior of the plurality of hardware agents and/or the control situation to a first neural network that is trained to output, from the items of information that characterize and/or influence the behavior of the plurality of hardware agents and/or the control situation, parameter values of the potential function, the potential function assigning to common action sequences, which each have an action sequence for each hardware agent in the control situation, a respective potential value that characterizes a utility that the hardware agents have from the respective common action sequence in the control situation;

ascertaining a control scenario for the control situation from a plurality of possible control scenarios by supplying the items of information that characterize and/or influence the behavior of the plurality of hardware agents and/or the control situation to a second neural network that is trained to ascertain, from the items of information that characterize and/or influence the behavior of the plurality of hardware agents and/or the control situation, one or more control scenarios from the plurality of possible control scenarios for the control situation, each of the control scenarios containing a set of possible common action sequences for the hardware agents;

ascertaining a common action sequence of the common action sequences for the plurality of hardware agents by seeking a local optimum of the ascertained potential function over the possible common action sequences of the ascertained control scenario;

controlling at least one of the plurality of hardware agents in accordance with the ascertained common action sequence, wherein the common action sequence is a common trajectory, wherein the second neural network determines a probability distribution over the control scenarios that reduces a number of Nash equilibria corresponding to the control scenarios that are used to predict the common trajectory;

training the first neural network through supervised learning with first training data that include a plurality of first training data elements, each of the first training data elements including items of information that characterize and/or influence the behavior of the plurality of hardware agents and/or the control situation, and a ground truth Nash equilibria for the common action sequence; and training the second neural network through supervised learning with second training data that include a plurality of second training data elements, each second training data element including items of information that characterize and/or influence the behavior of the plurality of hardware agents and/or the control situation, and the ground truth Nash equilibria for the control scenario.

* * * * *